Nov. 9, 1965    J. N. BAPTIST    3,216,905

PURIFICATION OF GAS WITH SOIL MECROORGANISMS

Filed June 12, 1963

INVENTOR

JAMES N. BAPTIST

BY

AGENT

United States Patent Office 3,216,905
Patented Nov. 9, 1965

3,216,905
PURIFICATION OF GAS WITH SOIL
MICROORGANISMS
James N. Baptist, Clarksville, Md., assignor to W. R. Grace & Co., New York, N.Y., a corporation of Connecticut
Filed June 12, 1963, Ser. No. 287,344
2 Claims. (Cl. 195—2)

The present invention relates to the purification of air, and more specifically to a novel method which may be used to remove obnoxious and undesirable impurities from air.

The prior art shows numerous devices for removing impurities from air. For example, devices containing activated charcoal and other absorbers are frequently used to absorb odors and dangerous gaseous impurities from an air stream. Other devices utilize a principle wherein odorous constituents of a gas stream are oxidized and hence converted to innocuous carbon dioxide. The so called "ozone purifier" is an example of such a device.

These prior art devices possess inherent drawbacks in that they either become rapidly saturated with organic odor producing materials or require the consumption of considerable electrical energy and in some cases impart dubious benefits. An air purification system which is truly self regenerating and self energized would indeed represent a useful development in the art of air purification and odor removal. Such a device would find wide application in confined areas having limited storage and power facilities such as fall out shelters and submarines, as well as in accessible areas of habitations such as animal houses and homes.

It is therefore an object of the present invention to provide an improved method for removing impurities from air.

It is another object to provide a self regenerating energized system for removing obnoxious and harmful substances from an air stream.

It is a further object to provide a self contained device which will continuously oxidize objectionable organic odor causing materials in air with a minimum of expense and maintenance.

Figure 1:
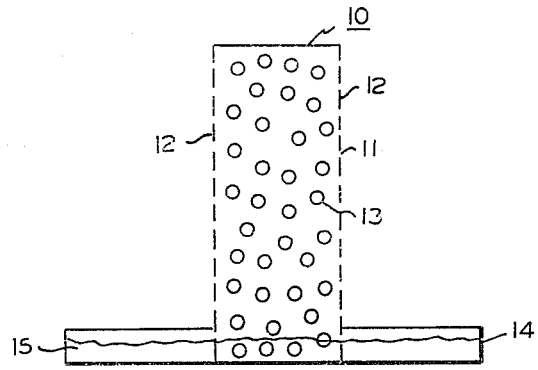
Figure 2:
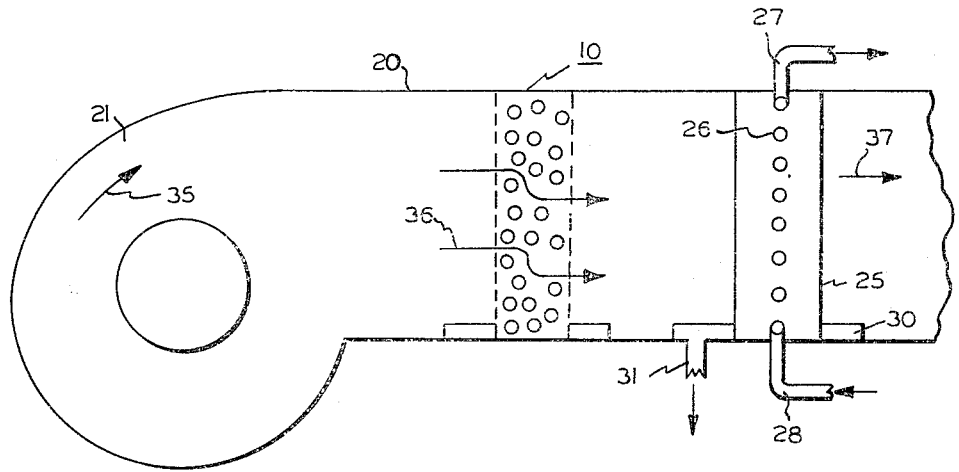

These and still further objects of the present invention will become readily apparent to one skilled in the art from the following examples and drawings wherein:

FIG. 1 is a cross-sectional view of a bacteria supporting cell which may be used in the present invention; and FIG. 2 is a cross-sectional view of air purification system which utilize the teachings of this invention.

Broadly, the present invention contemplates the method for removing objectionable components from an air stream which involves passing an impurity laden air stream through a porous supporting medium which contains microorganisms capable of oxidizing objectionable organic compounds.

More specifically, I have found that if an ordinary soil microorganism culture is placed on a supporting medium which contains only water and necessary nutrient inorganic salts, and an air containing obnoxious organic component is passed therethorugh, the microbes will effectively and completely oxidize the odorless organic materials to innocuous carbon dioxide. The microbes will live indefinitely on the odor causing organic material in the air stream, and no external power need be applied to the system other than that used to maintain a current of air through the system. Furthermore, present system which utilizes microbial cultures never requires regeneration or replacement so long as the medium is kept moist and in contact with odor laden air.

A more thorough understanding of the present system may be obtained from reference in FIG. 1 which illustrates a cross-sectional view of a microorganism support generally 10 which is used in the practice of the invention. It is seen the support 10 comprises a support housing 11 which generally consists of an elongated container provided with a multiplicity of holes 12 through which odor laden air may pass. The faces of support housing 11 may be made of an expanded mesh screen or other material having sufficient porosity to permit a large stream of gas to pass through. The holes 12 must be sufficiently small to maintain support material 13 therein.

Support material 13 shown in FIG. 1 comprises a quantity of finely divided material such as expanded mica, foamed plastic, vermiculite, sand, glass wool, or any other suitable finely divided material having a large surface area. This material is admixed with the inorganic salts and water necessary to support microorganism growth. The microbes (not shown in the drawing) are distributed throughout the support material 13. At the bottom of the support housing 11 in FIG. 1, is a tray-shaped reservoir 14 which maintains a supply of mineral solution generally indicated as 15. This solution is maintained at the bottom of the support material and in contact therewith. The water 15 by capillary action is distributed throughout the support material to provide a suitable condition for microorganism growth. Alternatively, the nutrient mineral solution may be sprayed continuously over the support material.

FIG. 2 illustrates an embodiment of the present invention wherein the microorganism support structure 10 has been incorporated in a forced air distribution system. In FIG. 2 it is seen that the microbe support system structure 10 (as portrayed in FIG. 1) is placed within a duct 20 down stream from a fan or blower system 21. Down stream from the microbe structure 10 is located an air treating device generally 25 which may be adapted to either heat or cool the air which subsequently passes through microbe support structure 10. Air treating structure 25 may be adapted for heating or cooling by passing either a hot or cool fluid through coils 26. Air treating system 25 is provided with fluid inlet 28 and fluid outlet 27.

In the event air treating system 25 is adapted for cooling, which necessarily results in some condensing of the water from the air stream which passes through the moist bacteria support material, condensate collector 30 in the form of a tray placed beneath the treating device 25, which is equipped with condensate of drain 31, provides means for carrying away condensed water.

In operation, it is seen that forced air from blower 21 is forced down duct 20 in the direction illustrated by arrow 35. The air is then forced through microbe support structure 10 including the microbe support material 13 as illustrated by arrow 36. In coming in contact with the support material the organic constituents of the air are thoroughly and completely oxidized to carbon dioxide by microorganisms contained therein. The odor free air then passes through the air treating device 25 which either cools or heats as desired. Finally the purified and treated air stream passes from the device as illustrated by arrow 37. The air subsequently may be conducted to a ventilated space.

The microbe support material used in the practice of the present invention may be any particulate material which is capable of maintaining sufficient moisture and nutrient salts required to support microbe growth. The material should also provide sufficient surface area to air passing therethrough for contact with microbes with sufficient thoroughness to provide complete oxidation. Typical materials are expanded vermiculite, sand, glass wool or a synthetic plastic material (foamed polystyrene, polypropylene fibers, etc.).

The microorganism cultures used to catalyze the oxidation reactions of the present invention are preferably natural mixed populations of soil microorganisms. It is possible to use a pure culture of a single bacterium or fungus. However, such cultures are difficult to protect from contamination. In addition, the process is not truly self-regenerating if a pure culture is used because the mineral elements gradually become tied up in a non-available form. With mixed cultures, a balanced population develops which depends on organic materials in the air stream for its energy source. Then protozoans and nematodes consume the bodies of other organisms and return the mineral elements to an available form. The net result is that the population as a whole acts as a catalyst for oxidation of organic materials in the air stream to $CO_2$. Under steady state conditions, no important overall change occurs in the microbial population and thus the population as a whole may be considered an oxidation catalyst.

As indicated above, in order to provide a growing and vigorous microbial culture there must be an ample supply of water. This means that the support material should be substantially saturated with water while the system is in operation. The water should also be provided with suitable inorganic nutrient materials necessary for sustained growth. These required inorganic nutrients include suitable amounts of $NH_4^+$, $K^+$, $Na^+$, $Mg^+$, $Ca^+$, $Fe^{+++}$, $SO_4^-$, $HPO_4^-$, $H_2PO_4^=$, $Cl^-$, $Co^{++}$, $Mn^{++}$, $Zn^{++}$, and $Cu^{++}$ which may be impregnated into the support material in the form of a solution, and then dried. Subsequent addition of water to the support material will provide the required growth medium.

In a slightly modified embodiment of those described above, a substantially dry absorbing support material such as activated charcoal may be used. This material may be saturated with microorganisms and nutrient mineral solution, then dried and placed in support 10. The dry activated charcoal will then physically adsorb the offensive organic materials from a substantially dry gas stream in a conventional manner. After the charcoal support material has been saturated with offensive organic matter, water may be added, and the biological degradation will occur as set forth previously. The advantage obtained from such a modification resides in the fact a substantially dry condition may be maintained in the system. This permits the direct production of dry odor free air without subsequent water removal.

When the aforedescribed dry unit is used in conjunction with the system set forth in FIGURE 2, it is generally preferred that two or more alternatively acting parallel connected units be used. This permits one dry unit to be in filtering operation while the other unit is moistened and regenerated by biological means.

The temperatures required for adequate operation of the present device generally range from about 0° C. to about 60° C., but best operation occurs at 20–30° C. Ordinarily these temperatures are provided in the normal habitable space required having air required to be treated in accordance with the present invention.

The illustrated embodiment of FIGURE 2 may be conveniently incorporated in the normal forced air heating system present in a home. Furthermore, special devices mounted in consoles or other suitable housings may be placed in a room or a space which requires air purification. The microbes will oxidize practically any organic material coming in contact therewith, providing the population has time to become adapted to the material. The present devices may be used to remove certain toxic gases such as nerve gases and other dangerous materials which may be used in biological warfare.

For example, if a nerve gas is to be removed, an enrichment culture technique is used to obtain a microbial population able to oxidize the gas. Then this mixed population is added to the microbial support.

To graphically illustrate the effectiveness of the present invention the following example is given which was conducted on a laboratory scale.

*Example I*

A column of about 2 feet long and 3 inches in diameter was packed with sand then saturated with a growth medium made as follows:

| | G. |
|---|---|
| $(NH_4)_2SO_4$ | 10.0 |
| $KH_2PO_4$ | 10.0 |
| $Na_2HPO_4 \cdot 7H_2O$ | 18.9 |
| $MgSO_4$ | 2.0 |
| $CaCl_2$ | 0.20 |
| $FeCl_3$ | 0.10 |
| $H_2O$, 1 liter. | |

$Co^{++}$, $Mn^{++}$, $Cu^{++}$, and $Zn^{++}$ were added in trace quantities. A few grams of soil were added to the column as an initial source of microorganisms. The odor source for this experiment was obtained by mixing $CaCO_3$ with cheese and inoculating the mixture with soil. After $CaCO_3$ neutralized the cheese acids, protein decomposing bacteria, clostridia, grew under anaerobic conditions and produced the very well-known odor of fermenting proteins. This odor source was constructed first and incubated 4 days until a strong odor was produced. The compounds causing this odor were undoubtedly ptomaines and related compounds. Then, this odor was mixed with a moist air stream and passed through the deodorizer described above. At first, the odor came through the device. However, after several days, it had become noticeably weaker, and after 7 days, the odor of ptomaines was nearly gone. This device was operated successfully for an additional 5 weeks. It was still removing the odor when it was disassembled. Since odor detection is somewhat subjective, 7 witnesses were asked to examine the device during the period of its operation. All were very positive that the odor was removed.

*Example II*

The fact that odor came through the device of Example I for the first few days is proof that odor removal was due to microorganisms rather than physical adsorption to soil or sand particles. To check this point again, a second device was made exactly like that in Example I. Then it was sterilized by steam heat at 120° C. for 1 hour. When this device was connected to the odor containing air stream, a very strong ptomaine odor came through within 2 hours.

The above clearly illustrates that highly efficient and practical odor-removing devices may be produced in accordance with the present invention. The use of a mixed microbial population provides a system which requires no periodic regeneration and no outside power source.

I claim:

1. A method for removing obnoxious organic materials from gases which comprises passing a substantially dry gas stream containing obnoxious organic impurities in contact with a substantially dry adsorbent material capable of physically adsorbing said impurities from said air stream, said adsorbent material being impregnated with a mixture of viable soil microorganisms in a dormant state and nutrient salts, removing said adsorbent material from said air stream when said material is substantially saturated with organic impurities, and adding water to said saturated adsorbent material, to activate said soil microorganisms and oxidize said impurities.

2. The method of claim 1 wherein said adsorbent material is activated charcoal.

References Cited by the Examiner

UNITED STATES PATENTS

| 1,701,825 | 2/29 | Seil | 195—2 |
| 2,200,581 | 5/40 | Pruss et al. | 195—2 |
| 2,793,196 | 5/57 | Pomeroy | 195—2 |

REUBEN FRIEDMAN, *Primary Examiner.*